United States Patent
Sipcic et al.

(10) Patent No.: US 10,719,378 B2
(45) Date of Patent: Jul. 21, 2020

(54) DOMAIN-SPECIFIC LANGUAGE FOR PROCESSING MESSAGE CONTENT

(71) Applicant: International Business Machines Corporation, Armonk, NY (US)

(72) Inventors: Slobodan Sipcic, Bethesda, MD (US); Peeyush Jaiswal, Boca Raton, FL (US); Priyansh Jaiswal, Boca Raton, FL (US); Naeem Ahmed, Troy, MI (US); Rahul Ragunathan, Okemos, MI (US); Austin Michael Delamar, Lansing, MI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/116,614

(22) Filed: Aug. 29, 2018

(65) Prior Publication Data

US 2020/0073735 A1    Mar. 5, 2020

(51) Int. Cl.
*G06F 3/06* (2006.01)
*G06F 9/54* (2006.01)

(52) U.S. Cl.
CPC .................... *G06F 9/546* (2013.01)

(58) Field of Classification Search
CPC ....................................... G06F 9/546
See application file for complete search history.

(56) References Cited

U.S. PATENT DOCUMENTS

| | | | |
|---|---|---|---|
| 6,188,976 B1 | 2/2001 | Ramaswamy | |
| 7,209,916 B1 * | 4/2007 | Seshadri | ............. H04L 12/1859 |
| 9,100,183 B2 | 8/2015 | Movshovitz | |
| 9,461,817 B2 | 10/2016 | Moore et al. | |
| 9,733,901 B2 | 8/2017 | Bernelas | |
| 2008/0005138 A1 | 1/2008 | Gauthier et al. | |

OTHER PUBLICATIONS

Farhana H. Zulkernine et al . "A Constraint-Driven Business Object Model for Service-Based Business Processes",2012 Ninth International Conference on Information Technology—New Generations, pp. 182-188 (Year: 212).*
List of Patents treated as related to U.S. Appl. No. 16/116,614, Appendix P, 2 pp.

(Continued)

*Primary Examiner* — Brian W Wathen
*Assistant Examiner* — Abdou K Seye
(74) *Attorney, Agent, or Firm* — Jay Wahlquist (57) ABSTRACT

A computing system may receive a message that includes message data and a schema. The message data may include values associated with fields. The message may include a plurality of rules. Each of the plurality of rules may specify a respective one or more fields from a plurality of fields associated with the message and a respective action from a plurality of actions to perform on the values associated with the respective one or more fields. One or more of the plurality of rules may specify one or more output values that are associated with one or more output values resulting from performing one or more actions from the plurality of actions. In response to receiving the message, the computing system may perform the plurality of rules to generate the one or more output values associated with the one or more output fields.

20 Claims, 7 Drawing Sheets

(56) References Cited

OTHER PUBLICATIONS

"Apache Avro™ 1.9.1 Specification," The Apache Software Foundation, Sep. 2, 2019, 20 pages. <https://avro.apache.org/docs/current/spec.html>.
Shopify, "EJSON—A JSON File with Asymmetric-key-encrypted values," retrieved from: https://shopify.github.io/ejson/ejson.5.html, Nov. 2014, 2 pp.

* cited by examiner

```
"actions": [{
  "name": "addFields",
  "parameters": ["a", "b"],
  "command": "a+b"
},
{
  "name": "subtractFields",
  "parameters": ["a", "b"],
  "command": "a-b"
},
{
  "name": "getDBVal",
  "parameters": ["c"],
  "command": "$myClass.getDBVal(c)"
},
{
  "name": "insertDBVal",
  "parameters": ["$content"],
  "command": "$myClass.insertDBVal($content)"
}
]
}
}
```

FIG. 2C

```
{"name": "message", "type": "record",
"fields": [
{"name" : "content", "type" : {
"name" : "content_record", "type" : "record",
"fields" : [
{"name" : "schema", "type" : "string"},
{"name" : "data", "type" : {
"name" : "data_record", "type" : "record",
"fields" : [
{"name" : "field1","type" : "string"},
{"name": "field2", "type": "string"},
{"name": "field3", "type": "string"},
{"name": "field4", "type": "string"}, {"name": "fieldN", "type": "string"}]
}}]}},
{"name": "context", "type": {
"name": "context_record", "type": "record",
"fields": [
{"name": "rules", "type": {
"type": "array",
"items": {
"name": "rules_record", "type": "record",
"fields": [
{"name": "order", "type": "long"},
{"name": "input", "type": {"type": "array", "items": "string"}},
{"name": "output", "type": ["string", "null"]},
{"name": "action", "type": "string"},
{"name": "precondition", "type": ["string", "null"]}],
}}},
{"name": "actions", "type": {
"type": "array",
"items": {
"name": "actions_record", "type": "record",
"fields": [
{"name": "name", "type": "string"},
{"name": "parameters", "type": {"type": "array", "items": "string"}},
{"name": "command", "type": "string"}]
}}}
]}}
]}
```

DOMAIN-SPECIFIC LANGUAGE FOR PROCESSING MESSAGE CONTENT

BACKGROUND

A computing system may process a message by performing rules that act on the message data included in the message. By performing rules that act on the message data included in the message, the computing system may generate additional data based on the data included in the message.

SUMMARY

In general, aspects of this disclosure describe techniques for defining rules to process a message within the message itself. That is, the message contains message data as well as processing rules and actions. The processing rules and actions may be defined within the message itself using domain-specific language. The domain-specific language is flexible and helps avoid embedding processing rules within application code that requires redeployment of the application code if changes are subsequently made to the processing rules. Thus, the techniques described herein enable advantages such as easy maintainability for data stream processing systems, for example, without taking such systems offline for tuning or scaling. A computing system may receive a message that contains message data as well as rules and actions and may perform the rules, including performing the actions specified in the rules to generate one or more output values for further processing by the computing system. By including the rules and actions that act upon message data in the same message as the message data, transformation logic that acts upon message data can be entirely referenced from within the message without necessarily requiring logic that is external to the message, while enabling the rules and actions to access resources and logic that are external to the message when needed.

In one aspect, the disclosure is directed to a method. The method includes receiving, by at least one processor, a message that includes a content portion and a context portion, where the content portion includes message data and a schema associated with the message data, where the message data includes values associated with fields that conform to the schema, where the context portion includes a plurality of rules and a plurality of actions, where each of one or more rules from the plurality of rules specifies a respective one or more fields from a plurality of fields associated with the message, a respective action from the plurality of actions to perform on the values associated with the respective one or more fields, and a respective output field associated with a respective output value resulting from performing the respective action, and where the plurality of fields associated with the message includes the fields in the message data and the respective output field specified by each of the one or more rules. The method further includes in response to receiving the message, performing, by the at least one processor, the plurality of rules to generate one or more output values associated with one or more output fields.

In another aspect, the disclosure is directed to a computing system. The computing system includes at least one processor. The computing system further includes at least one memory device. The computing system further includes at least one module stored by the at least one memory device and executable by the at least one processor, where the at least one module is configured to perform operations comprising: receive a message that includes a content portion and a context portion, where the content portion includes message data and a schema associated with the message data, where the message data includes values associated with fields that conform to the schema, where the context portion includes a plurality of rules and a plurality of actions, where each of one or more rules from the plurality of rules specifies a respective one or more fields from a plurality of fields associated with the message, a respective action from the plurality of actions to perform on the values associated with the respective one or more fields, and a respective output field associated with a respective output value resulting from performing the respective action, and where the plurality of fields associated with the message includes the fields in the message data and the respective output field specified by each of the one or more rules. The at least one module is further configured to perform operations comprising: in response to receiving the message, perform the plurality of rules to generate one or more output values associated with one or more output fields.

In another aspect, the disclosure is directed to a computer program product. The computer program product comprises a computer readable storage medium having program code embodied therewith, the program code executable by at least one processor to: receive a message that includes a content portion and a context portion, where the content portion includes message data and a schema associated with the message data, where the message data includes values associated with fields that conform to the schema, where the context portion includes a plurality of rules and a plurality of actions, where each of one or more rules from the plurality of rules specifies a respective one or more fields from a plurality of fields associated with the message, a respective action from the plurality of actions to perform on the values associated with the respective one or more fields, and a respective output field associated with a respective output value resulting from performing the respective action, and where the plurality of fields associated with the message includes the fields in the message data and the respective output field specified by each of the one or more rules. The program code is further executable by the at least one processor to: in response to receiving the message, perform the plurality of rules to generate one or more output values associated with one or more output fields.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

FIG. 3 illustrates an example message schema according to aspects of the present disclosure.

DETAILED DESCRIPTION

Figure 1:
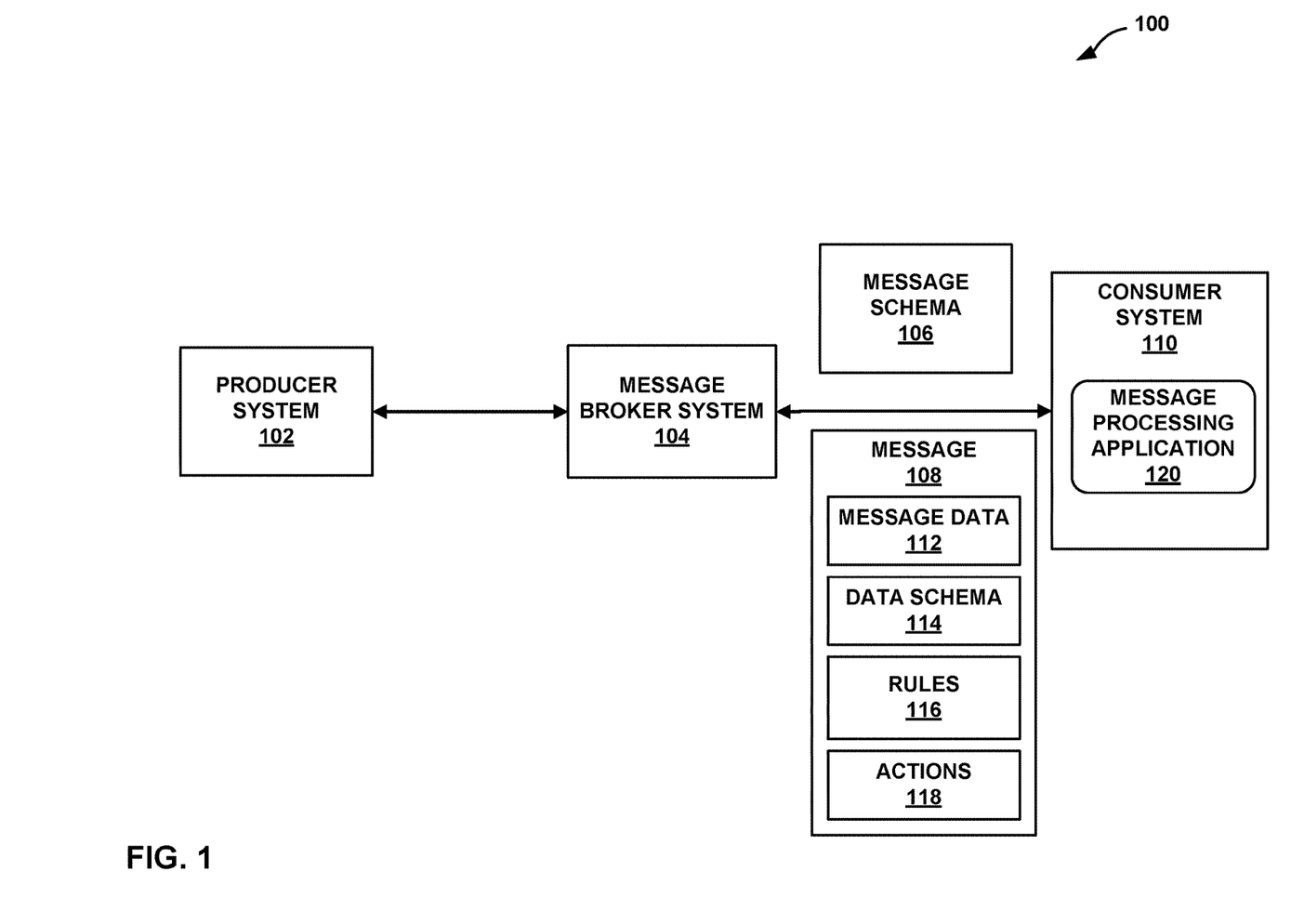
FIG. 1 illustrates a data streaming system according to aspects of the present disclosure.

FIG. 1 illustrates a data streaming system according to aspects of the present disclosure. As shown in FIG. 1, data streaming system 100 may include producer system 102, message broker system 104, data store 108, and consumer system 110. Producer system 102 may send messages to consumer system 110 vis message broker system 104.

Producer system 102 may be one of many producers that generates messages and sends streams of messages to message broker system 104. Consumer system 110 may be one of many consumers that subscribe to data streams from message broker system 104 and receives messages associated with the subscribed data streams from message broker 104. Message broker system 104 may be an intermediary system that facilitates distribution of messages to consumers such as consumer system 110 by receiving streams of messages from producers such as producer system 102, persisting the streams of messages from producers, and sends streams of messages to consumers such as consumer system 110. Producer system 102, message broker system 104, and consumer system 110 may be any suitable computing device or devices, including but not limited to desktop computers, laptop computers, mobile computing devices, servers, server clusters, and the like.

In some examples, message broker system 104 may be a cluster of computing devices that together implement an Apache Kafka™-based message broker system. Apache Kafka™ is a distributed publish-subscribe messaging system that is designed to be fast, scalable, and durable. In the publish-subscribe messaging paradigm, message broker system 104 may maintain feeds of messages in topics. Producer system 102 may send messages that are stored in message broker system 104 and consumer system 110 may read messages from producer system 102.

Producer system 102 may create and send messages that are associated with schemas to message broker system 104, and consumer system 110 may receive, from message broker system 104, messages created by and sent from producer system 102. In response to receiving a message, consumer system 110 may apply one or more rules to message data in the message. Consumer system 110 may apply the one or more rules to perform operations on the data contained in the message in order to generate data that is the result of performing such operations on the data in the message.

Producer system 102 may send message 108 either directly to consumer system 110 or via message broker system 104 to consumer system 110. To send message 108, producer system 102 may serialize message 108 using message schema 106 that defines the structure of message 108. Similarly, consumer system 110 may receive the serialized version of message 108 either directly from producer system 102 or from message broker system 104. Consumer system 110 may deserialize the serialized version of message 108 using message schema 106. Message processing application 120 may execute on consumer system 110 to process message 108, including performing rules and actions specified in message 108 to process data included in message 108 and to generate one or more additional values that are associated with message 108.

In accordance with aspects of the present disclosure, message processing application 120 may execute on consumer system 110 to receive, from message broker system 104 or from producer system 102, a message that includes a content portion and a context portion. The context portion may include message data and a data schema for the message data, and the context portion may include a plurality of rules and a plurality of actions. In the example of FIG. 1, message processing application 120 may receive message 108 that includes message data 112, data schema 114, rules 116, and actions 118.

Message data 112 included in message 108 may include values associated with fields that conform to data schema 114 included in the message. Data schema 114 may describe a set of constraints on the structure and on the content of message data 112. For example, a schema may describe the structure of one or more records contained in message data 112, the structure of one or more fields of a record in message data 112, the attributes of the one or more fields, and the like. In some examples, data schema 114 may be defined using JavaScript Object Notation (JSON), such as when the schema is an Apache Avro™ schema. In other examples, data schema 114 in accordance with techniques of this disclosure may be defined in any other suitable format, such as eXtensible Markup Language (XML) and the like.

Each of one or more rules from rules 116 may specify a respective one or more fields from a plurality of fields associated with message 108, a respective action from actions 118 to perform on the values associated with the respective one or more fields, and a respective output field associated with a respective output value resulting from performing the respective action, where the plurality of fields associated with message 108 may include the fields in message data 112 as well as output fields specified by rules 116.

Each action of actions 118 may specify one or more parameters and an operation to be performed on the one or more specified parameters. Such operations may include mathematical operations, string manipulation operations, or any other suitable operations that are performed on values of one or more specified fields in the message data to generate an output value. In some examples, the actions may also specify calls to external methods. For example, message processing application 120 that executes on consumer system 110 to process the message and to perform rules 116 specified by the message may include methods or functions that may be called by actions 118. Such methods or functions may include, in some examples, database calls to read a value from a database or to write a value, such as parameters of an action, to a database.

In response to receiving message 108, message processing application 120 may perform rules 116 to generate one or more output values associated with one or more output fields. To perform a rule, message processing application 120 may perform the action specified by the rule on the values associated with the one or more fields specified by the rule. Because the one or more fields specified by the rule act as the parameters for the action specified by the rule, message processing application 120 performs the rule by performing the operation specified by the specified action on the values associated with the one or more fields specified by the rule.

If the rule specifies an output field associated with an output value that is generated by the action, consumer system 110 may store the result of performing the operation specified by the action on the values associated with the one or more fields specified by the rule in the specified output field. In this way, consumer system 110 may perform rules 116 to generate one or more output values associated with one or more output fields.

In some examples, a rule from rules 116 may specify a precondition that has to be met in order for message processing application 120 to perform the action specified by the rule. The rule may specify a field associated with message 108 along with a precondition that the value of the specified field has to meet in order for message processing application 120 to perform the action specified by the rule. When message processing application 120 encounters a rule from rules 116 that specifies a precondition that the value of a specified field is required to meet, message processing application 120 may determine whether the value in the specified field meets the precondition. In response to determining that the value of the specified field meets the precondition, message processing application 120 may perform the action specified by the rule. On the other hand, in response to determining that the value of the specified field does not meet the precondition, message processing application 120 may refrain from performing the action specified by the rule.

By storing message data, rules, and actions within a single message, aspects of the present disclosure enable a computing system such as consumer system 110 to refrain from embedding rules within application code, such as within the application code of message processing application 120. Because rules are included along with message data upon which the rules act in a single message, rules in the message can be updated on the fly to include additional rules or to modify rules in the message without having to take message processing application 120 offline to update message processing application 120's application code to include the updated rules. Instead, when message processing application 120 is in the process of processing a message and performing rules included in the message, the rules in the message can be updated to include additional rules, and message processing application 120 may be able to perform the additional rules without having to take message processing application 120 offline and without having to restart message processing application 120.

In addition, by including both message data as well as data schema that defines the structure of the message data in a single message, aspects of the present disclosure may reduce the complexity of transmitting and receiving the message data and the data schema compared with approaches where the message data and the data schema that defines the structure of the message data are sent and received in separate messages.

In some examples, message 108 may not include rules 116 and/or actions 118. In one example, rules 116 and/or actions 118 may be stored in a registry in consumer system 110 or on an external system. When message processing application 120 receives message 108, message processing application 120 may determine rules 116 that are applicable to message 108, and may perform rules 116 and actions 118 specified by rules 116. In some examples, message 108 or message schema 106 may include an indication of rules 116 that are applicable to message 108, and message processing application 120 may determine rules 116 that are applicable to message 108 based on such indications.

Figure 2A:
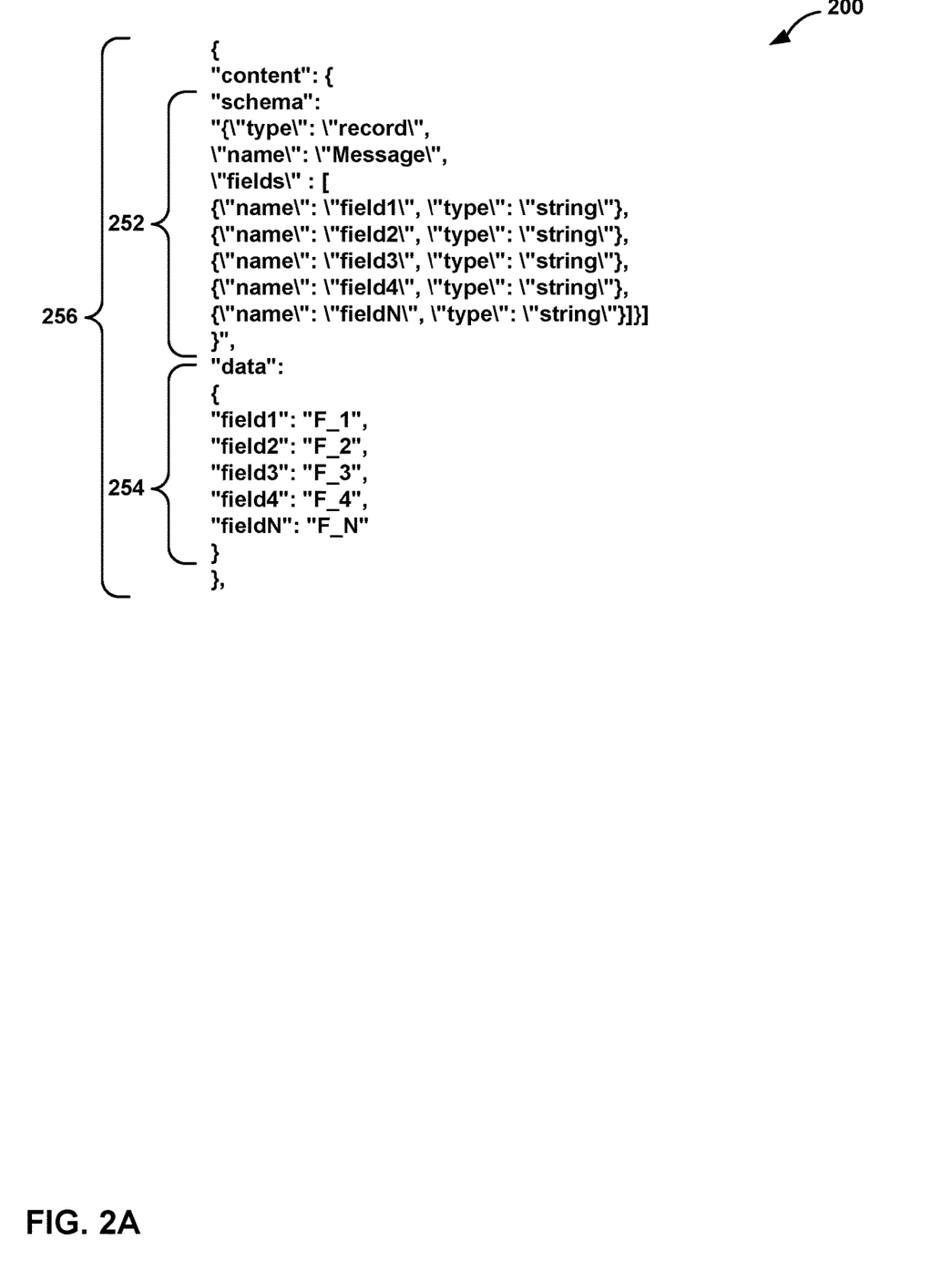
FIGS. 2A-2C illustrate an example message that includes message data, data schema, rules, and actions according to aspects of the present disclosure.
Figure 2B:
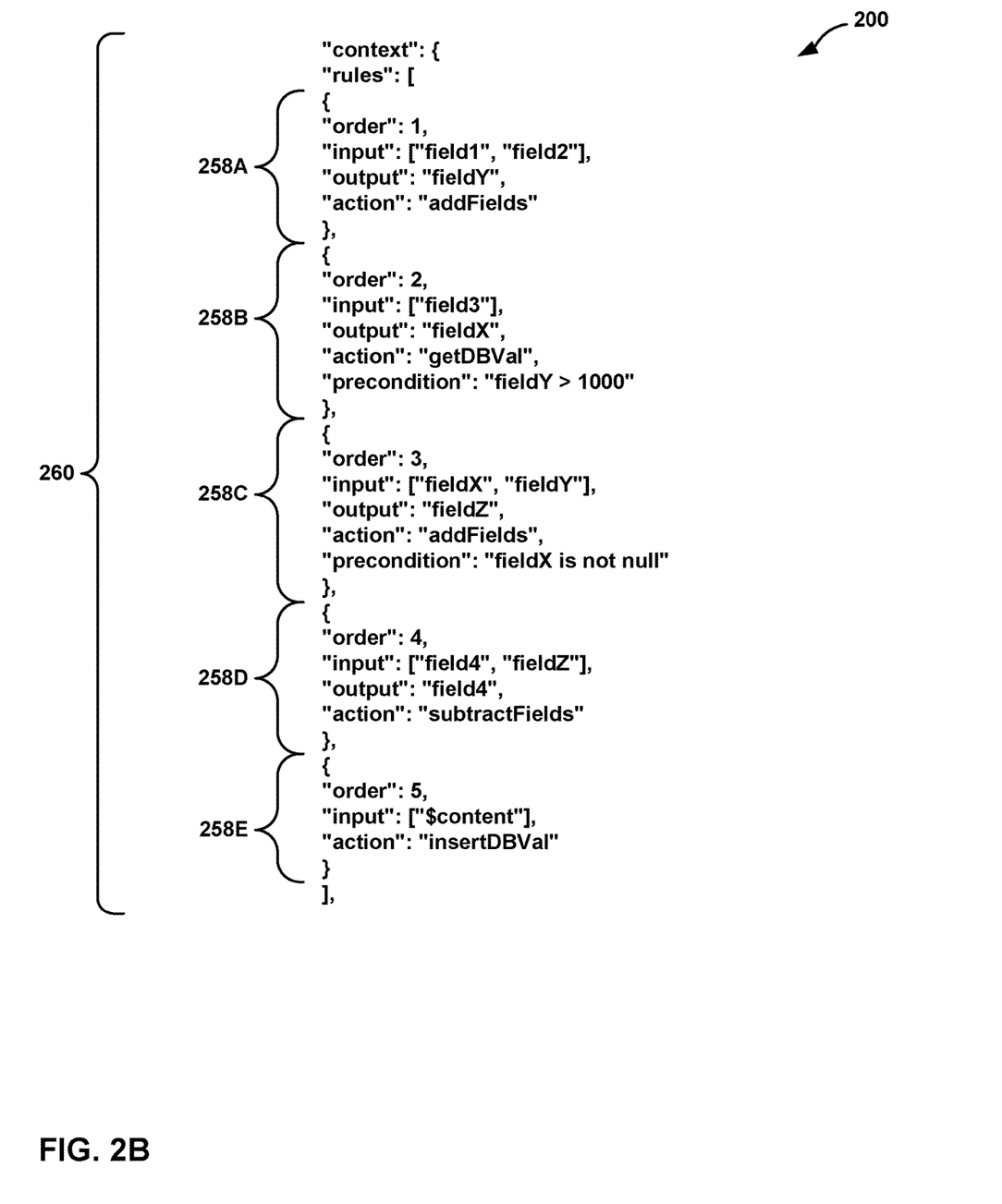
Figure 2C:
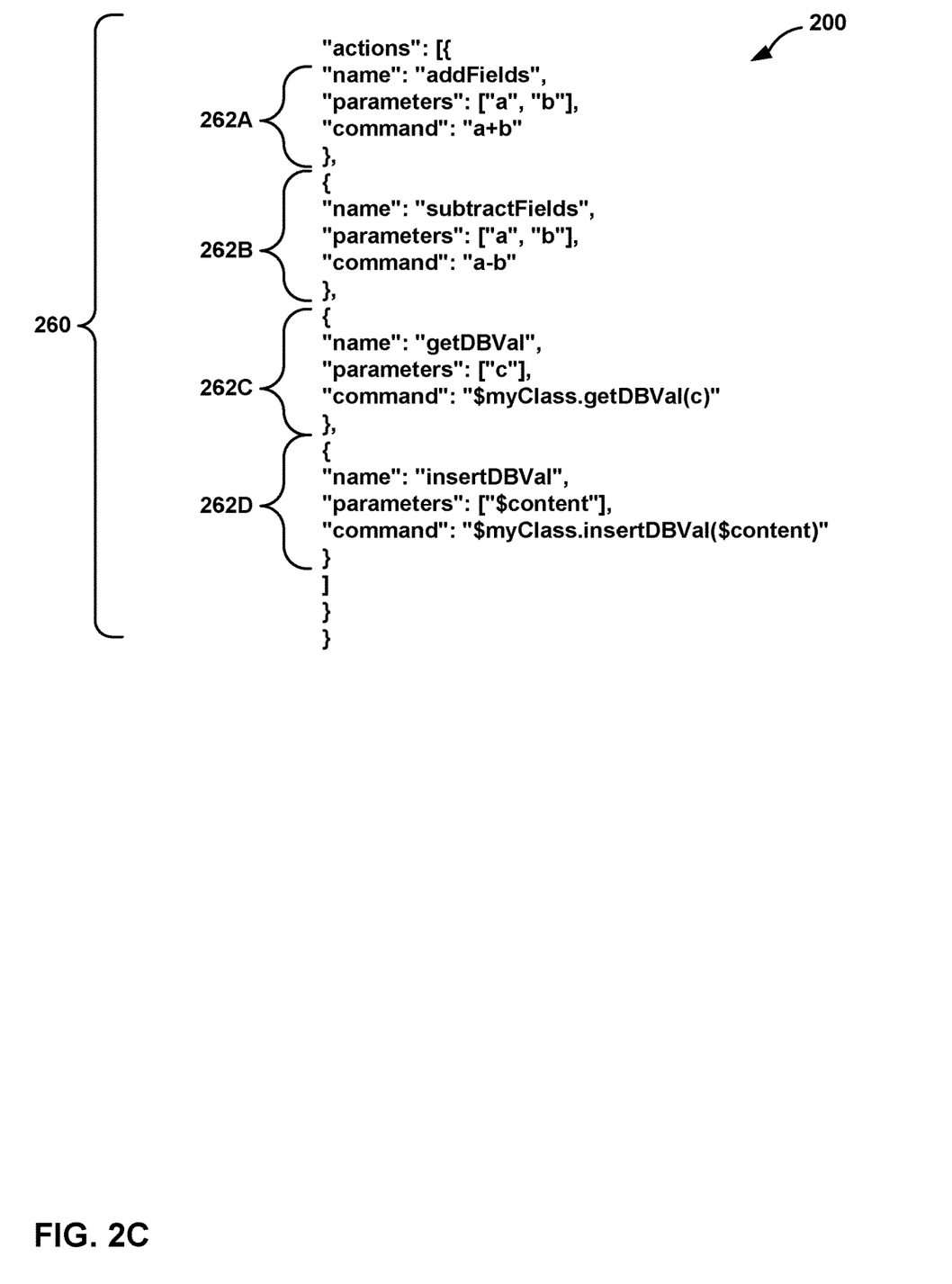

FIGS. 2A-2C illustrate an example message that includes message data, data schema, rules, and actions according to aspects of the present disclosure. While message 200 is shown in FIGS. 2A-2C as being defined in a domain-specific language using JSON, messages in accordance with techniques of this disclosure may be defined in a domain-specific language using any suitable format, such as XML.

As shown in FIGS. 2A-2C, message 200 may include content portion 256 shown in FIG. 2A and context portion 260 shown in FIGS. 2B and 2C. Content portion 256 includes data schema 252 and message data 254. Data schema 252 defines the structure of message data 254, including defining the fields contained in message data 254 and the types of value for each of the fields contained in message data. In the example of FIG. 2A, data schema 252 defines five fields named "field1", "field2", "field3", "field4", and "fieldN", respectively, that are included in message data 254. Data schema 252 further defines the data type of values associated with the fields as being a string (e.g., an array of characters). A message processing application that executes, for example, at consumer system 110 shown in FIG. 1, such as message processing application 120 shown in FIG. 1, may use data schema 252 to validate the fields in message data 254 and the values associated with the fields message data 254, such as to ensure data consistency in message data 254. Message data 254 may associate values to fields that according to data schema 252. In the example of FIG. 2B, message data 254 associates a value of "F_1" with the field named "field1", a value of "F_2" with the field named "field2", a value of "F_3" with the field named "field3", a value of "F_4" with the field named "field4", and a value of "F_N" with the field named "fieldN". In other examples, the fields in message data 254 may be associated with any value that conforms to data schema 252.

As shown in FIG. 2B, context portion 260 of message 200 may include rules 258A-258E ("rules 258"). rules 258 may correspond to rules 116 shown in FIG. 1 and may define an ordered list of input fields, output fields, and actions to be performed on the values in the input fields to determine the values for the output fields. The input fields may include one or more fields associated with message 200. Fields associated with message 200 may include the fields in message data 254.

Each one of rules 258 may specify a respective order of the rule. Because rules 258 are an ordered list of rules, a message processing application such as message processing application 120 shown in FIG. 1 may process rules 258 based on the order specified by each of rules 258A, such as in ascending order starting from the rule that specifies the lowest order.

Each one of rules 258 may also specify one or more fields associated with message 200 as one or more input fields and an action to be performed on the values of the one or more input fields. Each one of rules 258 may optionally specify an output field associated with an output value resulting from performing the specified action on the values of the specified one or more input fields, and may optionally specify a precondition that must be met in order to perform the action specified by the rule. As such, while each of the plurality of rules 258 may specify a respective one or more fields from a plurality of fields associated with message 200 and a respective action from the plurality of actions, it may be the case that one or more of the plurality of rules 258 may also specify a respective output field associated with a respective output value resulting from performing the respective action.

As shown in FIG. 2B, rule 258A may specify an order of the rule, one or more fields associated with message 200 that act as input data fields, an output data field, and an action. The order specified by of rule 258A may correspond with the order in which a message processing application processes rules 258. Because rule 258A specifies an order of "1", a message processing program may perform rule 258A prior to performing any of the other rules from rule 258.

rule 258A further specifies the fields "field1" and "field2" from message data 254 as input data fields for the action specified by rule 258A. rule 258A further specifies an action that is named "addFields", which is to be performed on the values in fields "field1" and "field2" to generate an output value. rule 258A further specifies an output field of "fieldY" that is associated with the output value.

In some examples, a rule from rules 258 may also specify a precondition that has to be met in order for a message processing application to perform the action specified by the rule. If the precondition is not met, consumer system 110 may refrain from performing the action specified by the rule. The precondition can be a precondition on a value of a field associated with message 20, or can be a precondition on an output value associated with an output field specified by another rule of rules 258 that is earlier in the order of rules 258.

In the example of FIG. 2C, rule 258B specifies a precondition that the value associated with the output field "fieldY" specified by rule 258A is greater than 1000. Because rule 258B specifies an order of "2", a message processing application may process rule 258A prior to processing rule 258B. Because processing rule 258A includes performing the action specified by rule 258A to generate a value associated with output field "fieldY", the value of the field "fieldY" is a known value when the message processing application begins to process rule 258B. As such, rule 258B may specify a precondition specified that must be met by the value associated with "fieldY" to determine whether to perform the action specified by rule 258B.

In addition to the precondition discussed above, rule 258B may specify the field named "field3" from message data 254 as an input field for rule 258B. rule 258B may specify an action named "getDBVal" that is to be performed on the value of the input field to generate an output value. rule 258B may also specify an output field named "fieldX" that is to be associated with the output value resulting from performing the action specified in rule 258B.

A rule such as rule 258C can specify the output fields of other rules from rules 258 as input fields for rule 258C as long as the other rules are ordered such that a message processing application will perform the other rules prior to performing rule 258C. Because rule 258C specifies an order of "3", rule 258C may specify the values associated with output fields specified by rules 258A or 258B as the one or more input fields for rule 258C. As discussed above, because fields associated with message 200 are available to be specified by rules 258 as input fields, and because output fields specified by rules 258 are eligible to act as input fields for other rules from rules 258, fields associated with message 200 may include both fields in message data 254 as well as output fields specified by rules 258.

rule 258C may specify the output field "fieldX" specified by rule 258B and the output field "fieldY" specified by rule 258A as input fields for rule 258C. rule 258C may further specify an action named "addFields" which is to be performed on the values associated with fields named "fieldX" and "fieldY" to generate an output value. rule 258C may further specify an output field named "fieldZ" that is associated with the output value generated by performing the action specified in rule 258C. In addition, rule 258C may specify a precondition that the value associated with the field named "fieldX" is not null.

In some examples, a rule from rules 258 may specify a field to be both an input field and an output field. The rule may specify an action to be perform on the value associated with the field to generate an output value, and may specify the same field as an output field, so that the output field is associated with the output value, thereby updating the value associated with the field with the output value.

In the example of FIG. 2B, rule 258D may specify an order of 4. rule 258D may further specify the field named "field4" from message data 254 and the output field named "fieldZ" specified by rule 258C as input fields for rule 258D. rule 258D may further specify an action named "subtractFields" which is to be performed on the values in fields named "field4" and "fieldZ" to generate an output value. rule 258D may further specify that the field named "field4" be the output field that is associated with the output value generated by performing the action specified in rule 258D. As can be seen, the output field specified by rule 258D is a field that is already associated with value. By specifying a field that is already associated with a value as the output field, rule 258D may specify that the value associated with the field named "field4" is updated with the result of performing the action specified by rule 258D.

In some examples, a rule may not specify an output field. This may be due to the rule specifying an action to be performed that does not produce a value that is to be associated with the message. Further, instead of specifying one or more fields associated with message 200 by the names of the fields, a rule may also specify all of the fields that are associated with the message. For example, rule 258E may use the parameter "$content" to specify every field associated with message 200 as being input fields for rule 258E. The fields that are associated with message 200 may include every field in message data 254 as well as every output field specified by rules 258 that are ordered to be performed by a message processing application before rule 258E. rule 258E may specify an action of "insertDBVal" to be performed on the values of the input data fields without specifying an output data field because the specified action may not generate an output value to be associated with the output data field.

As shown in FIG. 2C, context portion 260 of message 200 may include actions 262A-262D ("actions 262"), which are an example of actions 118 shown in FIG. 1. Actions 262 defines parameters and functions that are applied to the parameters. Examples of actions 262 may include mathematical functions (e.g., arithmetic operations), string manipulation functions (e.g., convert to uppercase, convert to lowercase, string concatenation, returning a substring, etc.), and the like. Examples of actions 262 may also include calling external methods defined in user-defined classes of message processing applications, and the like. Because context portion 260 of message 200 specifies actions 262 separately from rules 258 in message 200, actions 262 are abstracted from rules 258, so that the same action from actions 262 may be specified by multiple rules from rules 258 with values from different input fields and with different output fields. rules 258 may specify an action from actions 262 using the names specified by the action. For example, rule 258A may specify an "addFields" action to be performed on parameters that are the values associated with fields named "field1" and "field2" while rule 258C may specify the same "addFields" action to be performed on parameters that are the values associated with fields named "fieldX" and "fieldY". Further, rule 258A may specify that the output value from performing the "addFields" action be associated with an output field named "fieldY" and rule 258C may specify that the output value from performing the "addFields" action be associated with an output field named "field4".

Each action of actions 262 may specify a name for the action that a rule from rules 258 may use to identify the action, one or more parameters, and a command to be performed on the one or more parameters. Action 262A may specify a name of "addFields", parameters "a" and "b", and a command of "a+b" that sums the values of parameters "a" and "b". Action 262B may specify a name of "subtractFields", parameters "a" and "b", and a command of "a-b" that subtracts the value of parameter "b" from the value of parameter "a".

In some examples one or more actions from actions 262 may specify commands that call external methods defined in user-defined classes of message processing applications. For example, a message processing application such as message processing application 120 shown in FIG. 1 may include user-defined classes that define methods that may be called by executing actions 262.

For example, an action may specify a command that calls a method of a message processing application to insert values into a database, or to read values from a database. Action 262C may specify a name of "getDBVal", a parameter "c", and a command of "$myClass.getDBVal(c)". The command may be a call to method getDBVal( ) of class myClass defined in a message processing application with the parameter "c". Calling the method getDBVal( ) with the parameter "c" may cause the message processing application to execute the method getDBVal( ) to retrieve a value from a row, column, or table of a database as specified by the value of parameter "c".

Action 262D may specify a name of "insertDBVal", a parameter of "$content", and a command of "$myClass.insertDBVal($content)". The command may be a call to method insertDBVal( ) of class myClass defined in a message processing application with the parameter "$myconent". Calling the method insertDBVal( ) with the parameter "$content" may cause the message processing application to execute the method insertDBVal( ) to insert the values of parameter "$content" into rows, columns, or tables of a database.

FIG. 3 illustrates an example message schema according to aspects of the present disclosure. A message schema may describe the structure of the associated message, so that computing systems may use the message schema to serialize, deserialize, and/or validate a message associated with the message schema. Message schema 300 may be an example of message schema 106 shown in FIG. 1, and may be associated with a message, such as message 108 shown in FIG. 1 and message 200 shown in FIG. 2. Further, while message schema 300 is shown in FIG. 3 as being defined using JSON, message schemas in accordance with techniques of this disclosure may be defined in any suitable format, such as XML. As shown in FIG. 3, message schema 300 may include a content portion definition 302 that defines the structure of the content portion of an associated message and a context portion definition 304 that defines the context portion of the associated message. Content portion definition 302 may include data schema definition 306 that defines the structure and data type of the data schema in the message, and may also include message data definition 308 that defines the structure of the fields contained in the message data as well as the data types of the values of the fields.

Context portion definition 304 may include rules definition 310 and action definition 312. Rules definition 310 defines the structure of the rules included in the message. The rules in the message may be defined as an array of records, where each record includes a field associated with the order of the rule, the one or more input fields associated with the rule, an output field associated with the input field, an action associated with the rule, and a precondition field associated with the rule. Because a rule may not necessarily specify an output field or a precondition, rules definition 310 indicates that "null" is an acceptable data type for values associated with the output field and the precondition field, so that fields of a rule that are associated with a value "null" are deemed to not be specified by the rule.

Action definition 312 defines the structure of the actions included in the message. The actions in the message may be defined as an array of records, where each record specifies a field associated with the name of the action, a field associated with the parameters for the action, and a field associated with the operation to be performed on the parameters.

that defines the rules for the message and may also include action definition 210 that defines the actions that the rules for the message may perform.

Figure 4:
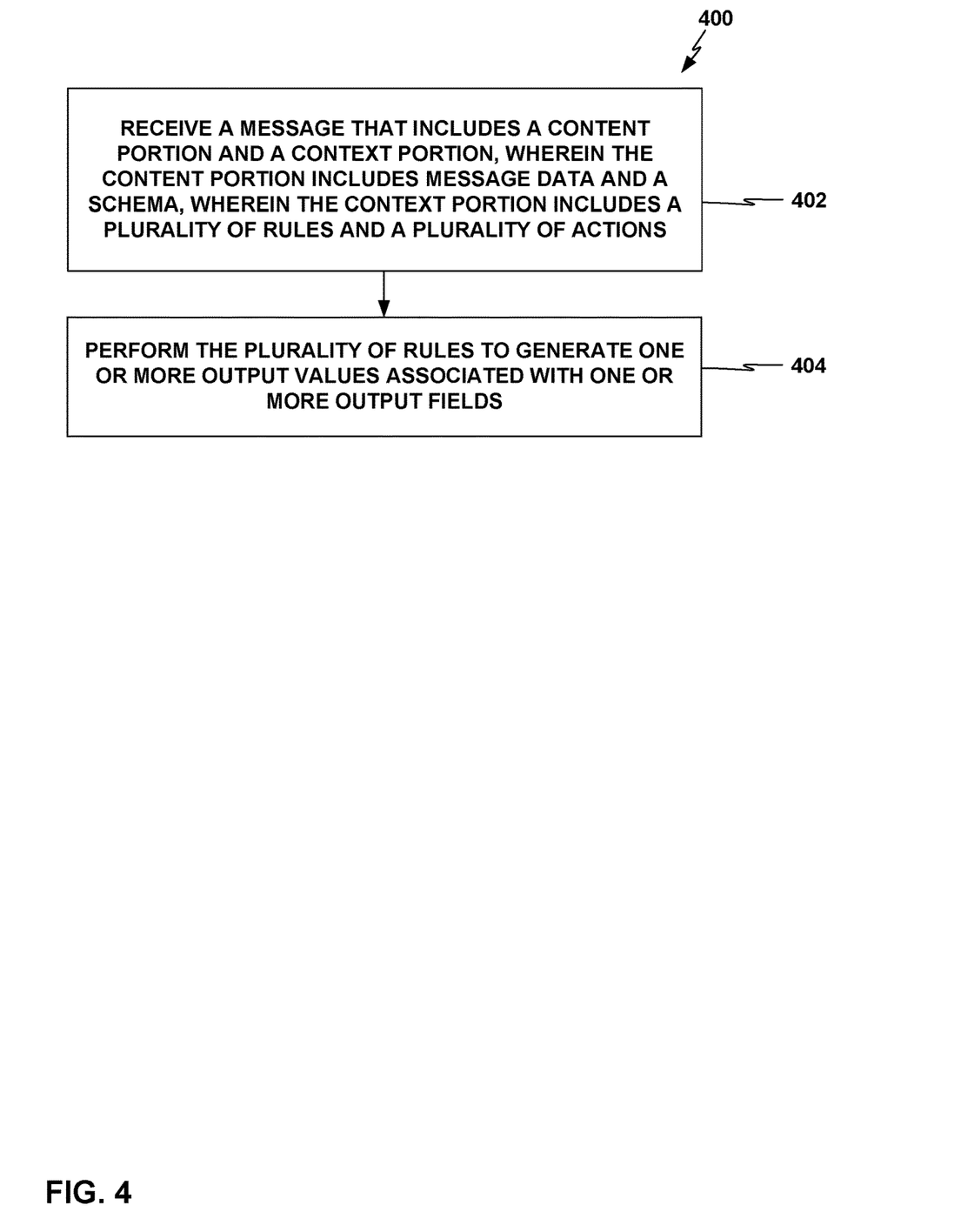
FIG. 4 is a flowchart illustrating a process for processing a message.

FIG. 4 is a flowchart illustrating a process for processing a message. FIG. 4 is described with respect to FIGS. 1, 2A-2C, and 3. As shown in FIG. 4, message processing application 120 executing on consumer system 110 may receive a message 108 that includes a content portion and a context portion (402). The content portion includes message data 112 and a schema 114 associated with the message data 112. The message data 112 includes values associated with fields that conform to the schema 114. The context portion includes a plurality of rules 116 and a plurality of actions 118. Each of one or more rules from the plurality of rules 116 specifies a respective one or more fields from a plurality of fields associated with the message 108, a respective action from the plurality of actions 118 to perform on the values associated with the respective one or more fields, and a respective output field associated with a respective output value resulting from performing the respective action. The plurality of fields associated with the message 108 includes the fields in the message data 112 and the respective output field specified by each of the one or more rules. Message processing application 120 may further, in response to receiving the message 108, perform the plurality of rules 116 to generate one or more output values associated with one or more output fields (404).

In some examples, a rule from the plurality of rules 116 specifies a precondition on a value of a field from a plurality of fields associated with the message 108 for performing the rule, and wherein performing the one or more of the plurality of rules 116 includes performing the respective action specified by the rule in response to determining that the value of the field meets the precondition.

In some examples, message processing application 120 may refrain from performing the respective action specified by the rule in response to in response to determining that the value of the field does not meet the precondition.

In some examples, a rule from the one or more rules specifies one of the respective one or more fields associated with a value on which the respective action is to be performed as the respective output field to which the respective output value is associated.

In some examples, the plurality of actions includes a call to a method of a message processing system 120, wherein the message processing system 120 executes on consumer system 110 to perform the method. In some examples, performing the method includes retrieving one or more values from a database. In some examples, the method includes inserting one or more values into a database. In some examples, the plurality of actions includes one or more mathematical operations.

In some examples, message processing system 120 may further update the context portion of the message to include an additional rule. The message processing system 120 may, in response to updating the context portion, perform the additional rule.

Figure 5:
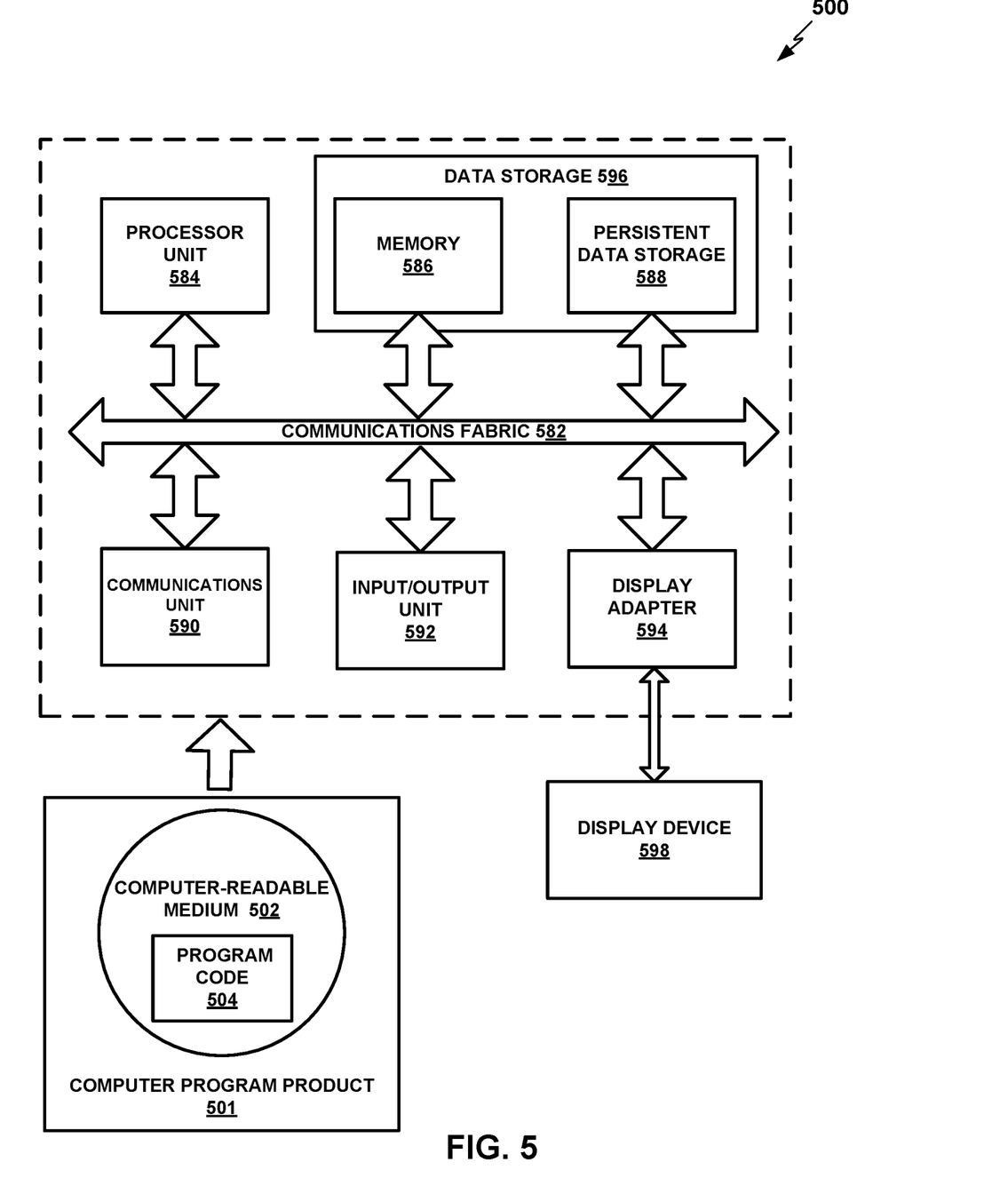
FIG. 5 is a block diagram of a computing device 500 that may be used to perform the techniques of the present disclosure.

FIG. 5 is a block diagram of a computing device 500 that may be used to perform the techniques of the present disclosure. Computing device 500 may be an example of one or more of any of the computing systems described in FIG. 1, such as one of the computing devices making up producer system 102, one of the computing devices making up message broker system 104, and one of the computing devices making up consumer system 110. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 500 may include a computer having capabilities or formats other than or beyond those described herein.

In the illustrative example of FIG. 5, computing device 500 includes communications fabric 582, which provides communications between processor unit 584, memory 586, persistent data storage 588, communications unit 590, and input/output (I/O) unit 592. Communications fabric 582 may include a dedicated system bus, a general system bus, multiple buses arranged in hierarchical form, any other type of bus, bus network, switch fabric, or other interconnection technology. Communications fabric 582 supports transfer of data, commands, and other information between various subsystems of computing device 500.

Processor unit 584 may be a programmable central processing unit (CPU) configured for executing programmed instructions stored in memory 586. In another illustrative example, processor unit 584 may be implemented using one or more heterogeneous processor systems in which a main processor is present with secondary processors on a single chip. In yet another illustrative example, processor unit 584 may be a symmetric multi-processor system containing multiple processors of the same type. Processor unit 584 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 584 may include a multi-core processor, such as a dual core or quad core processor, for example. Processor unit 584 may include multiple processing chips on one die, and/or multiple dies on one package or substrate, for example. Processor unit 584 may also include one or more levels of integrated cache memory, for example. In various examples, processor unit 584 may comprise one or more CPUs distributed across one or more locations.

Data storage 596 includes memory 586 and persistent data storage 588, which are in communication with processor unit 584 through communications fabric 582. Memory 586 can include a random access semiconductor memory (RAM) for storing application data, i.e., computer program data, for processing. While memory 586 is depicted conceptually as a single monolithic entity, in various examples, memory 586 may be arranged in a hierarchy of caches and in other memory devices, in a single physical location, or distributed across a plurality of physical systems in various forms. While memory 586 is depicted physically separated from processor unit 584 and other elements of computing device 500, memory 586 may refer equivalently to any intermediate or cache memory at any location throughout computing device 500, including cache memory proximate to or integrated with processor unit 584 or individual cores of processor unit 584.

Persistent data storage 588 may include one or more hard disc drives, solid state drives, flash drives, rewritable optical disc drives, magnetic tape drives, or any combination of these or other data storage media. Persistent data storage 588 may store computer-executable instructions or computer-readable program code for an operating system, application files comprising program code, data structures or data files, and any other type of data. These computer-executable instructions may be loaded from persistent data storage 588 into memory 586 to be read and executed by processor unit 584 or other processors. Data storage 596 may also include any other hardware elements capable of storing information, such as, for example and without limitation, data, program code in functional form, and/or other suitable information, either on a temporary basis and/or a permanent basis.

Persistent data storage 588 and memory 586 are examples of physical, tangible, non-transitory computer-readable data storage devices. Data storage 596 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 584 can also be suitably programmed to read, load, and execute computer-executable instructions or computer-readable program code for data analyzer 23, as described in greater detail above. This program code may be stored on memory 586, persistent data storage 588, or elsewhere in computing device 500. This program code may also take the form of program code 504 stored on computer-readable medium 502 comprised in computer program product 500, and may be transferred or communicated, through any of a variety of local or remote means, from computer program product 500 to computing device 500 to be enabled to be executed by processor unit 584, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 584 can be suitably programmed to read, load, and execute instructions of the operating system.

Communications unit 590, in this example, provides for communications with other computing or communications systems or devices. Communications unit 590 may provide communications through the use of physical and/or wireless communications links. Communications unit 590 may include a network interface card for interfacing with enterprise network 18, public network 15, an Ethernet adapter, a Token Ring adapter, a modem for connecting to a transmission system such as a telephone line, or any other type of communication interface. Communications unit 590 can be used for operationally connecting many types of peripheral computing devices to computing device 500, such as printers, bus adapters, and other computers. Communications unit 590 may be implemented as an expansion card or be built into a motherboard, for example.

The input/output unit 592 can support devices suited for input and output of data with other devices that may be connected to computing device 500, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 592 may also include any type of interface for video output in any type of video output protocol and any type of monitor or other video display technology, in various examples. It will be understood that some of these examples may overlap with each other, or with example components of communications unit 590 or data storage 596. Input/output unit 592 may also include appropriate device drivers for any type of external device, or such device drivers may reside elsewhere on computing device 500 as appropriate.

Computing device 500 also includes a display adapter 594 in this illustrative example, which provides one or more connections for one or more display devices, such as display device 598, which may include any of a variety of types of display devices. It will be understood that some of these examples may overlap with example components of communications unit 590 or input/output unit 592. Input/output unit 592 may also include appropriate device drivers for any type of external device, or such device drivers may reside elsewhere on computing device 500 as appropriate. Display adapter 594 may include one or more video cards, one or more graphics processing units (GPUs), one or more video-capable connection ports, or any other type of data connector capable of communicating video data, in various examples. Display device 598 may be any kind of video display device, such as a monitor, a television, or a projector, in various examples.

Input/output unit 592 may include a drive, socket, or outlet for receiving computer program product 501, which comprises a computer-readable medium 502 having computer program code 104 stored thereon. For example, computer program product 501 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 502 may include any type of optical, magnetic, or other physical medium that physically encodes program code 504 as a binary series of different physical states in each unit of memory that, when read by computing device 500, induces a physical signal that is read by processor 584 that corresponds to the physical states of the basic data storage elements of storage medium 502, and that induces corresponding changes in the physical state of processor unit 584. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 584, thereby physically causing or configuring processor unit 584 to generate physical outputs that correspond to the computer-executable instructions, in a way that causes computing device 500 to physically assume new capabilities that it did not have until its physical state was changed by loading the executable instructions comprised in program code 504.

In some illustrative examples, program code 504 may be downloaded over a network to data storage 596 from another device or computer system for use within computing device 500. Program code 504 comprising computer-executable instructions may be communicated or transferred to computing device 500 from computer-readable medium 502 through a hard-line or wireless communications link to communications unit 590 and/or through a connection to input/output unit 592. Computer-readable medium 502 comprising program code 504 may be located at a separate or remote location from computing device 500, and may be located anywhere, including at any remote geographical location anywhere in the world, and may relay program code 504 to computing device 500 over any type of one or more communication links, such as the Internet and/or other packet data networks. The program code 504 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 504 may be transmitted from a source computer-readable medium 502 over non-tangible media, such as communications links or wireless transmissions containing the program code 504. Program code 504 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 500.

Aspects of the present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

The invention claimed is:

1. A computer-implemented method comprising:
   receiving, by at least one processor, a message that includes a content portion and a context portion,
   wherein the content portion includes message data and a schema associated with the message data,
   wherein the message data includes values associated with fields that conform to the schema,
   wherein the context portion includes a plurality of rules and a plurality of actions,
   wherein each of one or more rules from the plurality of rules specifies a respective one or more fields from a plurality of fields associated with the message, a respective action from the plurality of actions to perform on the values associated with the respective one or more fields, and a respective output field associated with a respective output value resulting from performing the respective action, and
   wherein the plurality of fields associated with the message includes the fields in the message data and the respective output field specified by each of the one or more rules; and
   in response to receiving the message, performing, by the at least one processor, the plurality of rules to generate one or more output values associated with one or more output fields.

2. The method of claim 1, wherein a rule from the plurality of rules specifies a precondition on a value of a field from a plurality of fields associated with the message for performing the rule, and wherein performing the one or more of the plurality of rules includes performing the respective action specified by the rule in response to determining that the value of the field meets the precondition.

3. The method of claim 2, further comprising:

refraining, by the at least one processor, from performing the respective action specified by the rule in response to determining that the value of the field does not meet the precondition.

4. The method of claim 1, wherein a rule from the one or more rules specifies one of the respective one or more fields associated with a value on which the respective action is to be performed as the respective output field to which the respective output value is associated.

5. The method of claim 1, wherein the plurality of actions includes a call to a method of a message processing system, further comprising:
performing, by the message processing system on the at least one processor, the method.

6. The method of claim 5, wherein performing the method further comprises:
retrieving, by the at least one processor, one or more values from a database.

7. The method of claim 5, wherein performing the method further comprises:
inserting, by the at least one processor, one or more values into a database.

8. The method of claim 1, wherein the plurality of actions includes one or more mathematical operations.

9. The method of claim 1, further comprising:
updating, by the one or more processors, the context portion of the message to include an additional rule; and
in response to updating the context portion, performing, by the at least one processor, the additional rule.

10. A computing system comprising:
at least one processor;
at least one memory device; and
at least one module stored by the at least one memory device and executable by the at least one processor, wherein the at least one module is configured to perform operations comprising:
receiving a message that includes a content portion and a context portion,
wherein the content portion includes message data and a schema associated with the message data,
wherein the message data includes values associated with fields that conform to the schema,
wherein the context portion includes a plurality of rules and a plurality of actions,
wherein each of one or more rules from the plurality of rules specifies a respective one or more fields from a plurality of fields associated with the message, a respective action from the plurality of actions to perform on the values associated with the respective one or more fields, and a respective output field associated with a respective output value resulting from performing the respective action, and
wherein the plurality of fields associated with the message includes the fields in the message data and the respective output field specified by each of the one or more rules; and
in response to receiving the message, performing the plurality of rules to generate one or more output values associated with one or more output fields.

11. The computing system of claim 10, wherein a rule from the plurality of rules specifies a precondition on a value of a field from a plurality of fields associated with the message for performing the rule, and wherein the at least one module is further configured to perform operations comprising: performing the respective action specified by the rule in response to determining that the value of the field meets the precondition.

12. The computing system of claim 11, wherein the at least one module is further configured to perform operations comprising:
refraining from performing the respective action specified by the rule in response to determining that the value of the field does not meet the precondition.

13. The computing system of claim 10, wherein a rule from the one or more rules specifies one of the respective one or more fields associated with a value on which the respective action is to be performed as the respective output field to which the respective output value is associated.

14. The computing system of claim 10, wherein the plurality of actions includes a call to a method of the at least one module.

15. The computing system of claim 10, wherein the at least one module is further configured to perform operations comprising:
updating the context portion of the message to include an additional rule;
in response to updating the context portion, performing the additional rule.

16. A computer program product for sending a message, the computer program product comprising a computer readable storage medium having program code embodied therewith, the program code executable by at least one processor to:
receive a message that includes a content portion and a context portion,
wherein the content portion includes message data and a schema associated with the message data,
wherein the message data includes values associated with fields that conform to the schema,
wherein the context portion includes a plurality of rules and a plurality of actions,
wherein each of one or more rules from the plurality of rules specifies a respective one or more fields from a plurality of fields associated with the message, a respective action from the plurality of actions to perform on the values associated with the respective one or more fields, and a respective output field associated with a respective output value resulting from performing the respective action, and
wherein the plurality of fields associated with the message includes the fields in the message data and the respective output field specified by each of the one or more rules; and
in response to receiving the message, perform the plurality of rules to generate one or more output values associated with one or more output fields.

17. The computer program product of claim 16, wherein a rule from the plurality of rules specifies a precondition on a value of a field from a plurality of fields associated with the message for performing the rule, and wherein the program code is further executable by the at least one module to:
perform the respective action specified by the rule in response to determining that the value of the field meets the precondition.

18. The computer program product of claim 17, wherein the program code is further executable by the at least one module to:
refrain from performing the respective action specified by the rule in response to determining that the value of the field does not meet the precondition.

19. The computer program product of claim 16, wherein a rule from the one or more rules specifies one of the respective one or more fields associated with a value on which the respective action is to be performed as the respective output field to which the respective output value is associated.

20. The computer program product of claim 16, wherein the plurality of actions includes a call to a method of a message processing application.

* * * * *